US008469793B2

(12) United States Patent
Visser

(10) Patent No.: US 8,469,793 B2
(45) Date of Patent: Jun. 25, 2013

(54) GAMING APPARATUS AND METHOD INCLUDING HIDDEN OBJECTS

(75) Inventor: Antoon Christiaan Visser, Coogee (AU)

(73) Assignee: Aristocrat Technologies Australia Pty Limited (AU)

( * ) Notice: Subject to any disclaimer, the term of this patent is extended or adjusted under 35 U.S.C. 154(b) by 1006 days.

(21) Appl. No.: 12/196,842

(22) Filed: Aug. 22, 2008

(65) Prior Publication Data

US 2009/0197666 A1 Aug. 6, 2009

(30) Foreign Application Priority Data

Aug. 24, 2007 (AU) ................................ 2007904598

(51) Int. Cl.
*A63F 9/24* (2006.01)
*A63F 13/00* (2006.01)

(52) U.S. Cl.
USPC ................... 463/20; 463/16; 463/17; 463/22; 463/25; 463/31

(58) Field of Classification Search
USPC ................................................ 463/20, 31, 22
See application file for complete search history.

(56) References Cited

U.S. PATENT DOCUMENTS

| | | | | |
|---|---|---|---|---|
| 3,642,287 | A * | 2/1972 | Lally et al. | 73/143 R |
| 5,580,055 | A * | 12/1996 | Hagiwara | 273/143 R |
| 5,722,891 | A | 3/1998 | Inoue | |
| 5,882,261 | A * | 3/1999 | Adams | 463/20 |
| 5,984,782 | A | 11/1999 | Inoue | |
| 6,027,115 | A * | 2/2000 | Griswold et al. | 273/143 R |
| 6,517,432 | B1 * | 2/2003 | Jaffe | 463/16 |
| 6,672,960 | B1 * | 1/2004 | B-Jensen | 463/20 |
| 6,758,473 | B2 * | 7/2004 | Seelig et al. | 273/143 R |
| 6,896,617 | B2 * | 5/2005 | Daly | 463/20 |
| 7,108,602 | B2 * | 9/2006 | Daly | 463/20 |
| 7,217,189 | B2 * | 5/2007 | Kaminkow | 463/20 |
| 7,252,288 | B2 * | 8/2007 | Seelig et al. | 273/143 R |
| 7,410,420 | B2 * | 8/2008 | Shiraishi | 463/21 |
| 7,918,725 | B2 * | 4/2011 | Baerlocher | 463/20 |
| 2002/0055382 | A1 * | 5/2002 | Meyer | 463/20 |
| 2003/0064779 | A1 * | 4/2003 | Suda | 463/20 |
| 2003/0176210 | A1 * | 9/2003 | Vancura | 463/16 |
| 2003/0176217 | A1 * | 9/2003 | vancura | 463/25 |
| 2004/0051239 | A1 * | 3/2004 | Seelig et al. | 273/138.1 |
| 2004/0209673 | A1 * | 10/2004 | Shiraishi | 463/20 |

(Continued)

FOREIGN PATENT DOCUMENTS

| | | |
|---|---|---|
| JP | 8173591 | 7/1996 |
| JP | 2001353257 | 12/2001 |
| JP | 2003052886 | 2/2003 |
| JP | 2006271998 | 10/2006 |

*Primary Examiner* — Steven J Hylinski
(74) *Attorney, Agent, or Firm* — McAndrews, Held & Malloy, Ltd.

(57) ABSTRACT

A method of game play, where a plurality of graphic objects are displayed on the display (106), each graphic object being operable to present one or more symbols. A subset of the graphic objects (604, 606, 608, 610) are activated to present symbols on the display, and at least one remaining graphic object (602) is obscured during the activation. The remaining graphic object (602) is revealed if a combination of symbols presented on the activated subset matches an eligibility criterion, and the revealed graphic object (602) is activated to present one or more symbols. An award is awarded if the symbols displayed on the graphic objects match a specified winning criterion.

8 Claims, 5 Drawing Sheets

U.S. PATENT DOCUMENTS

2004/0242313 A1* 12/2004 Munoz ............................ 463/20
2005/0049032 A1 3/2005 Kobayashi
2005/0075156 A1* 4/2005 Seelig et al. ...................... 463/1
2005/0096113 A1* 5/2005 Gabuchian ...................... 463/16
2005/0130737 A1* 6/2005 Englman et al. ................ 463/25
2005/0159208 A1* 7/2005 Pacey ............................. 463/20
2007/0232383 A1* 10/2007 Berman .......................... 463/20
2008/0015009 A1* 1/2008 Seelig et al. .................... 463/20
2008/0070672 A1* 3/2008 Inamura .......................... 463/20

* cited by examiner

GAMING APPARATUS AND METHOD INCLUDING HIDDEN OBJECTS

RELATED APPLICATIONS

This application claims priority to Australian Provisional Patent Application No. 2007904598, having a filing date of Aug. 24, 2007, entitled "Gaming Apparatus And Method Including Hidden Objects," which is hereby incorporated by reference herein in its entirety.

BACKGROUND OF THE INVENTION

The present invention generally relates to gaming machines and methods of gaming. A particular embodiment of the present invention relates to a game in which at least one object is initially hidden.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

SUMMARY OF THE INVENTION

According to a first aspect of the invention there is provided a method for use with a gaming machine that is arranged to select symbols, present the selected symbols on a display and award an award if a winning outcome occurs, the method comprising:

(a) displaying a plurality of graphic objects on the display, each graphic object operable to present one or more symbols;

(b) activating a subset of the graphic objects to present symbols on the display, wherein at least one remaining graphic object is obscured during said activation;

(c) revealing the at least one remaining graphic object if a combination of symbols presented on the activated subset matches an eligibility criterion;

(d) activating the at least one revealed graphic object to present one or more symbols; and (e) awarding the award if symbols displayed on the graphic objects match a specified winning criterion.

Preferably the symbols presented on the activated subset remain unchanged as the at least one revealed graphic object is activated.

Preferably a first award is awarded if the eligibility criterion is satisfied.

Preferably the first award is modified to form the award, dependent on symbols presented on the at least one uncovered graphic object.

Alternatively the method comprises generating an indication of a pending award if the eligibility criterion is satisfied.

Preferably the pending award forms the award if the winning criterion is satisfied.

In one embodiment the graphic objects are spinning reels.

Preferably activating the spinning reels comprises causing one or more of the reels to spin and halting the spun one or more reels to present at least one symbol.

In another embodiment the graphic objects are representations of cards and activating the cards comprises turning one or more of the cards to present one or more symbols.

In a further embodiment the graphic objects are representations of dice and activating the graphic objects comprises rolling one or more dice to present one or more symbols.

In a further embodiment the graphic objects are representations of balls and activating the graphic objects comprises causing at least one ball to present a number or symbol. In some arrangements activating the graphic object comprises causing at least one ball to move along a trajectory to a halting position in which at least one symbol is displayed on each ball.

According to a further aspect of the invention there is provided a method for use with a gaming machine that is arranged to select symbols, present the selected symbols on a display and award an award if a winning outcome occurs, the method comprising:

(a) displaying a plurality of reels on which the symbols are presented;

(b) causing a subset of the reels to spin while at least one remaining reel is obscured;

(c) revealing the at least one remaining reel if a combination of symbols displayed on the subset of reels satisfies an eligibility criterion;

(d) causing the at least one revealed reel to spin; and (e) awarding the award if a combination of displayed symbols satisfies a winning criterion.

According to a further aspect, the invention broadly resides in a gaming machine that provides a game in which a plurality of symbols are selected and presented on a display and if a winning combination occurs, the gaming machine awards an award, the gaming machine comprising a user interface in communication with a game controller that is operable to:

(a) display a plurality of graphic objects on the display, each graphic object being operable to present one or more symbols;

(b) activate a subset of the graphic objects to present symbols on the display, wherein at least one remaining graphic object is obscured during said activation;

(c) reveal the at least one remaining graphic object if a combination of symbols presented on the activated subset matches an eligibility criterion;

(d) activate the at least one revealed graphic object to present one or more symbols; and (e) award the award if symbols displayed on the graphic objects match a specified winning combination.

According to a further aspect, the invention broadly resides in a gaming machine that is arranged to select symbols, present the selected symbols on a display and award an award if a winning outcome occurs, the gaming machine comprising a user interface in communication with a game controller that is operable to:

(a) display a plurality of reels on which the symbols are presented;

(b) cause a subset of the reels to spin while at least one remaining reel is obscured;

(c) reveal the at least one remaining reel if a combination of symbols displayed on the subset of reels satisfies an eligibility criterion;

(d) cause the at least one revealed reel to spin; and (e) award the award if a combination of displayed symbols satisfies a winning criterion.

According to a further aspect, the invention broadly resides in instructions executable by a game controller to implement the method as described in the preceding paragraphs and to such instructions when stored in a storage medium readable by the game controller.

Further aspects of the present invention and further embodiments of the aspects described in the preceding paragraphs will become apparent from the following description, given by way of example and with reference to the accompanying drawings.

BRIEF DESCRIPTION OF THE DRAWINGS

One or more embodiments of the invention will now be described with reference to the figures in which.

DETAILED DESCRIPTION

Figure 1:
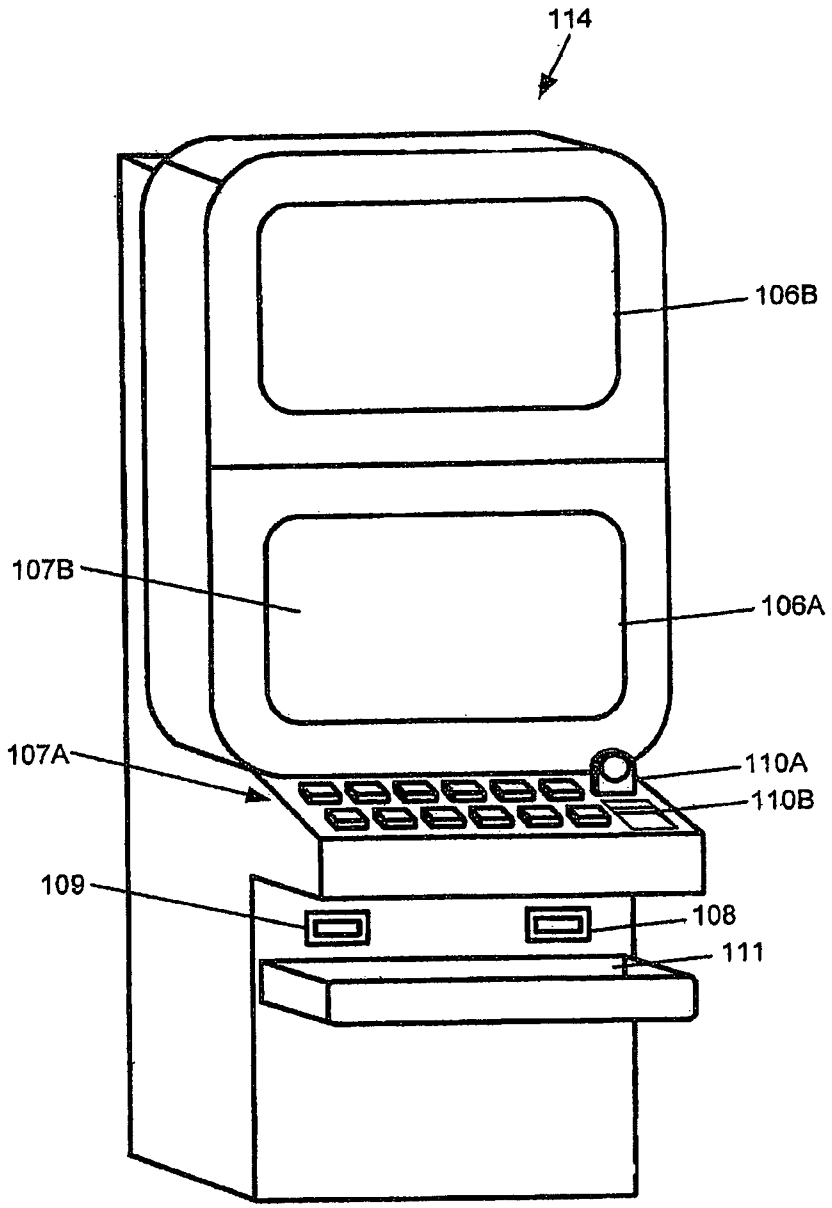
FIG. 1 shows schematically a view of a gaming console suitable for implementing the present invention.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
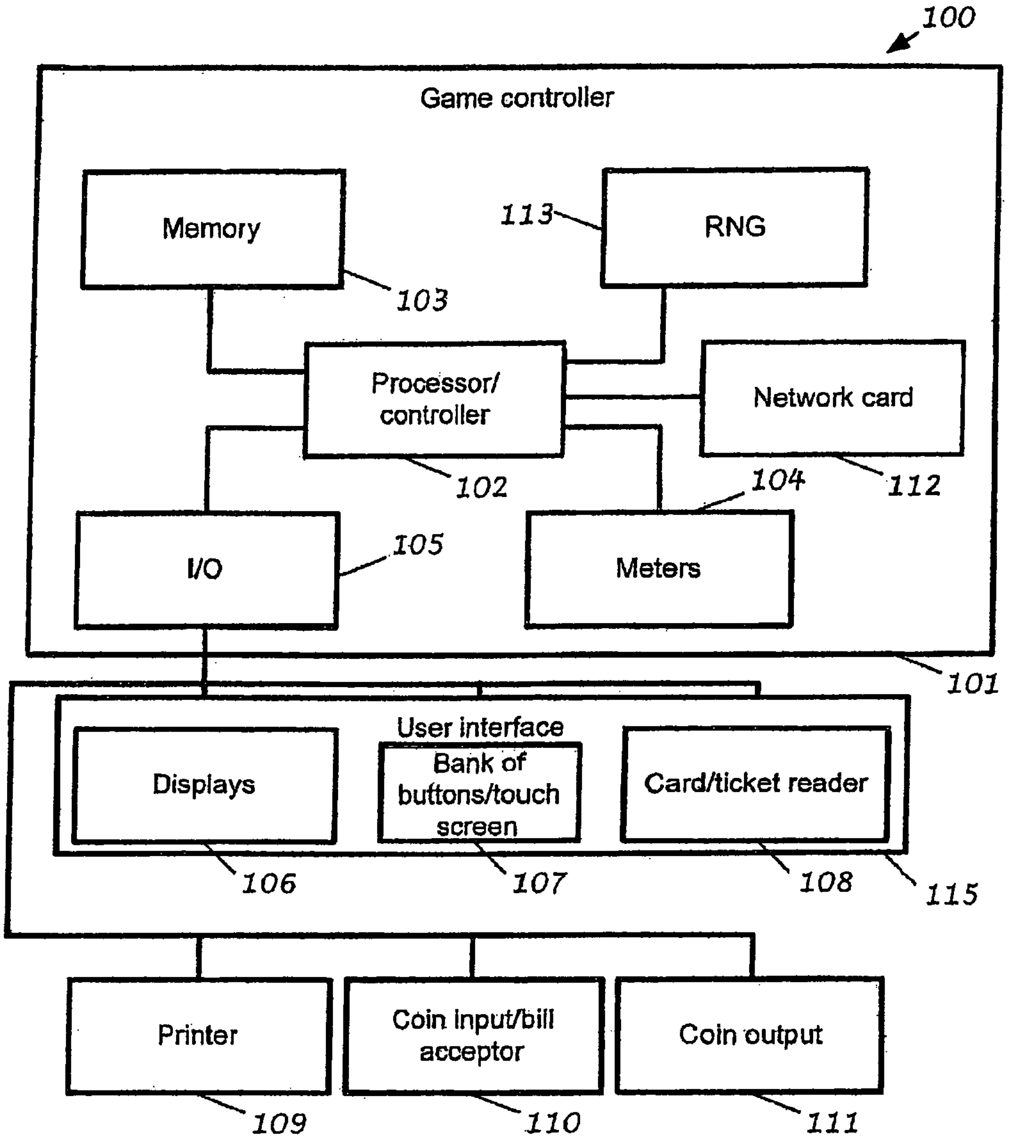
FIG. 2 shows a block diagram of gaming machine suitable for implementing the present invention.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
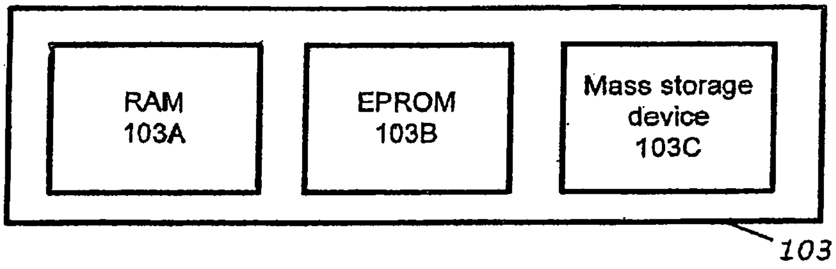
FIG. 3 shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
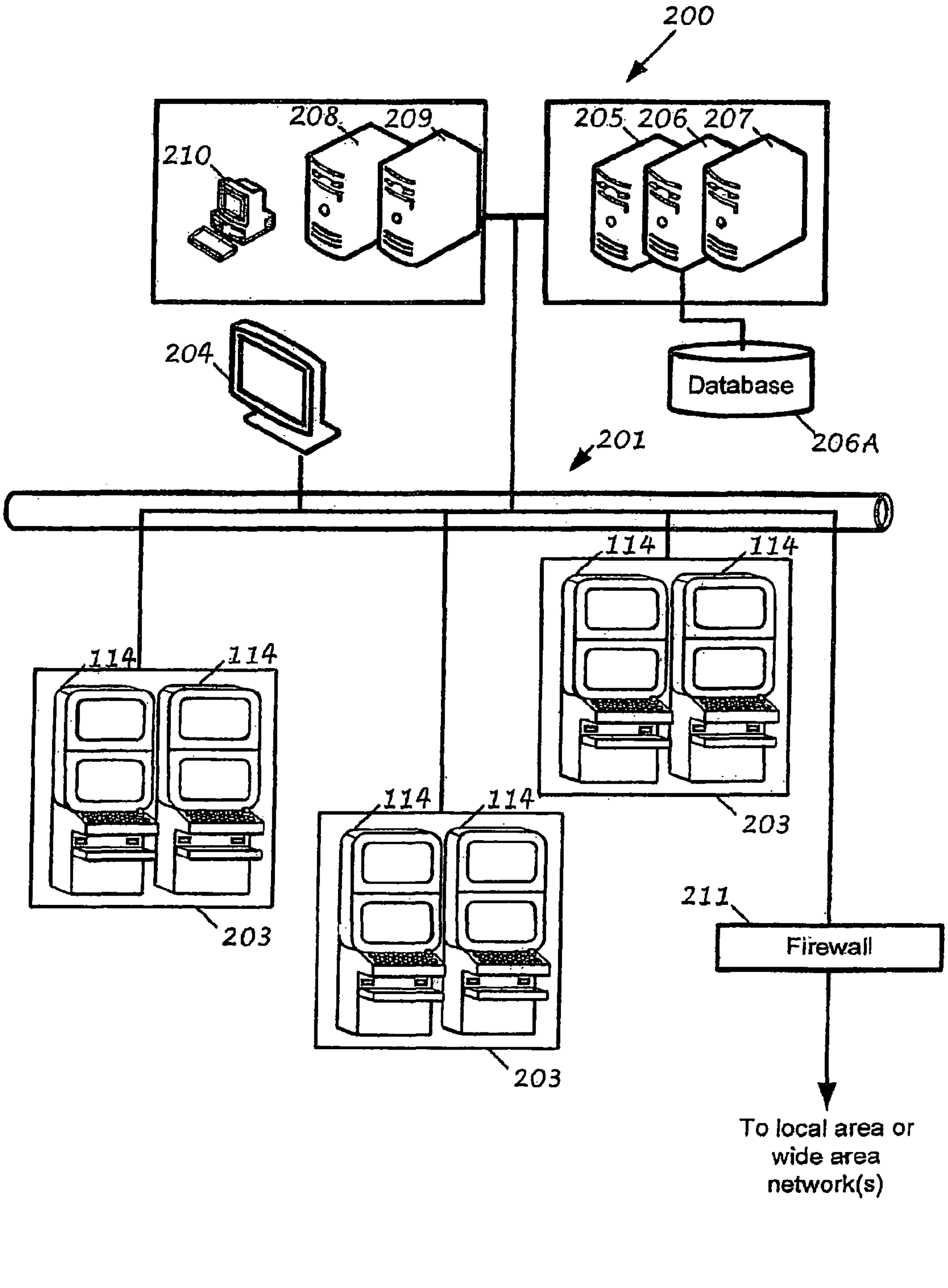
FIG. 4 shows schematically a network gaming system suitable for implementing the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming consoles 114 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming consoles 114, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

Figure 5:
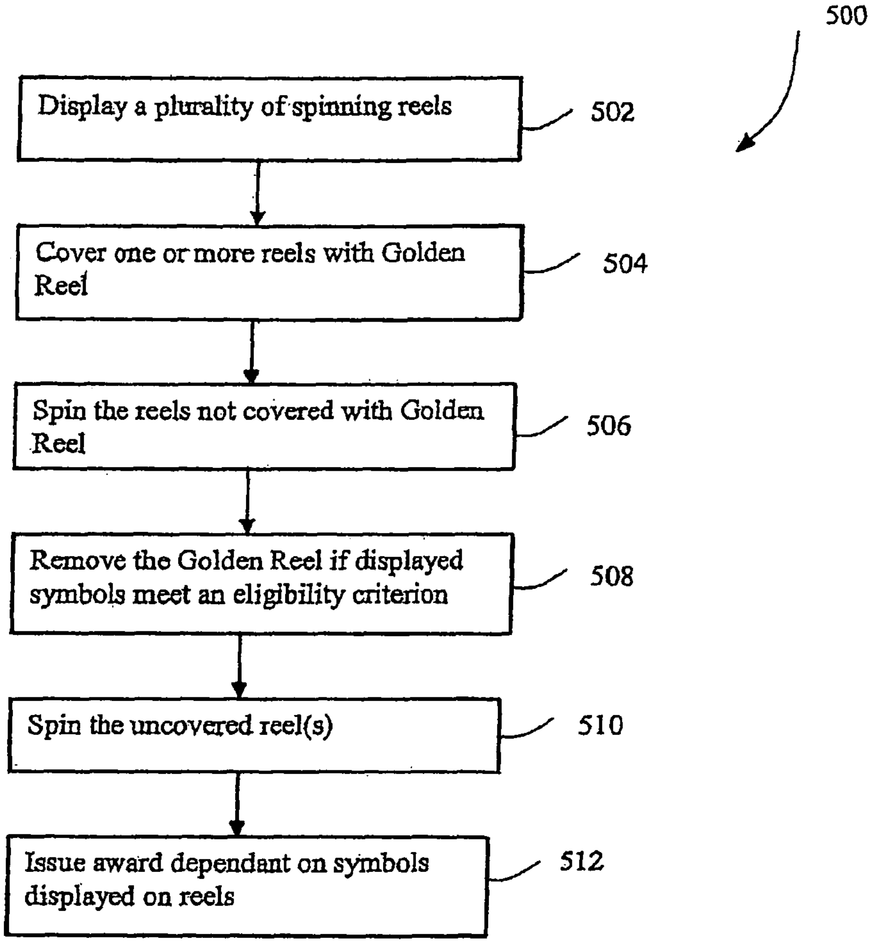
FIG. 5 shows a flow diagram of a process performed in accordance with an embodiment of the present invention.

FIG. 5 shows a process flow diagram of a process 500 performed in accordance with an embodiment of the present invention. The process may be performed by the gaming system 200, in which the gaming consoles 114 each include game controllers 101 to form gaming machines 100. However, those skilled in the relevant arts will appreciate that the process will also be able to be implemented by other gaming systems. For example, the described process may also be performed on a stand-alone gaming console 114.

In the arrangements described herein, a plurality of graphic objects are displayed on the displays 106. At least one of the graphic objects is obscured or hidden behind a covering. The graphic objects which are not hidden are activated to present symbols on the display 106. If an eligibility criterion is met by the displayed symbols, then the covering is removed from the hidden object(s). The uncovered object is then activated to display one or more further symbols, and the symbols shown on the graphic objects are used to complete prize patterns and determine prizes.

In one embodiment the graphic objects are spinning wheels. This embodiment is further described with reference to the flow diagram of FIG. 5 and the screenshots of FIGS. 6 and 7.

FIG. 5 shows a method 500 that is performed when the Golden Reel game is initiated on the gaming console 114. The Golden Reel game may be a feature available from a base game played on gaming console 114.

The game controller 101 monitors the bill acceptor and/or coin input 110 and/or information received by the card/ticket reader 108 or network card 112 for a deposit of credit and in response causes the hardware meters 104 to increment according to the denomination of the game. The game controller 101 then monitors the user interface 107 for the input of a wager. If there are sufficient credits in the meters 104 to support the wager, game play is commenced by the game controller 101.

The Golden Reel feature described herein may be available for all games and all bets in a base game, or may only be available for eligible bets and/or eligible games played on the gaming console 114. Eligibility for the Golden Reel game may be determined by known methods such as suitable antebets or a trigger event in a base game which initiates free games.

When the Golden Reel feature is initiated, in step 502 software running on the game controller 101 causes the display of a plurality of reels on displays 106.

Figure 6:
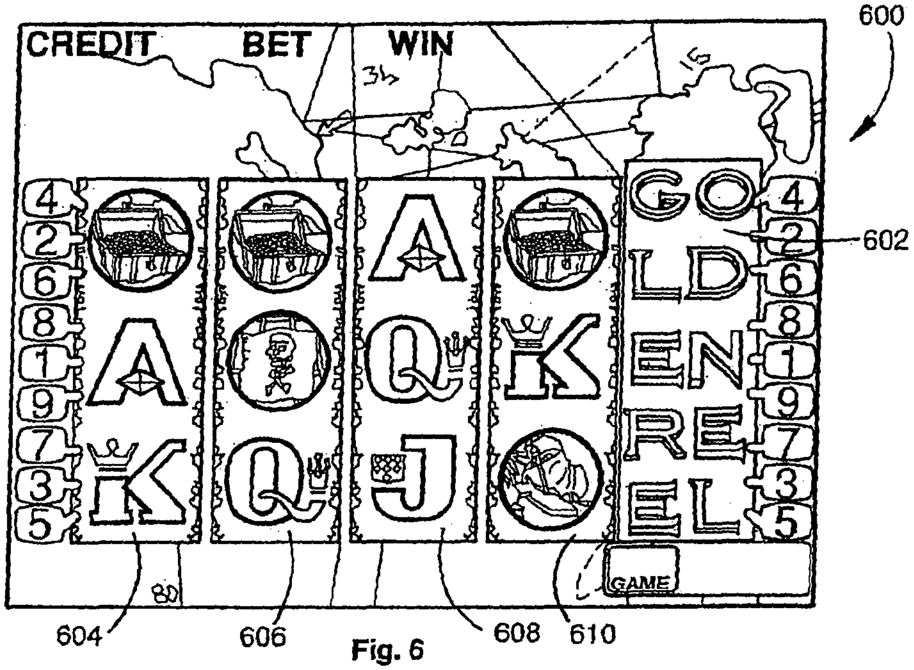
FIG. 6 shows an example of a display with five spinning reels of which one is covered by a Golden Reel.

An example is shown in FIG. 6, which shows a screenshot 600 of an arrangement in which software running on the computational device 102 causes five reels 602-610 to be displayed on displays 106. In the example, reel 602 is covered with a Golden Reel symbol (process 504). This reel may be coloured a bright golden colour to add to the visual appeal of the screen display 600. The subset of spinning reels 604, 606, 608, 610 each display three symbols, forming an array with four columns and three rows.

In the example shown, a single reel is covered with a Golden Reel. However, more than one reel may be covered in the Golden Reel game.

Next, in process 506 the reels which are not covered with a Golden Reel are spun and halted to display an array of symbols. Spinning the reels includes determining a set of symbols to display (using, for example, the random number generator 113) and displaying an animated graphic sequence rendered to display 106 that represents a reel spinning. The reels 604-610 may be spun simultaneously or individually. In the example of screenshot 600 no eligible combination of symbols is shown and the Golden Reel 602 remains covered.

If the displayed symbols meet an eligibility criterion, then in process 508 the Golden Reel is removed from the hidden reel 602. In one arrangement the hidden Golden Reel is uncovered if a sequence of four equal symbols is displayed on the four reels 604, 606, 608 and 610 in any pay line. In other options the player may need to purchase a spin of the Golden Reel, either before or during the game. There may also be a random triggering event in a base game that triggers a spin of the Golden Reel. In other arrangements the player may be awarded a series of spins of the Golden Reel and an eligibility criterion may be whether there are any remaining spins in the series. Other eligibility criteria may also be used to determine whether or not to uncover and spin the hidden Golden Reel.

Figure 7:
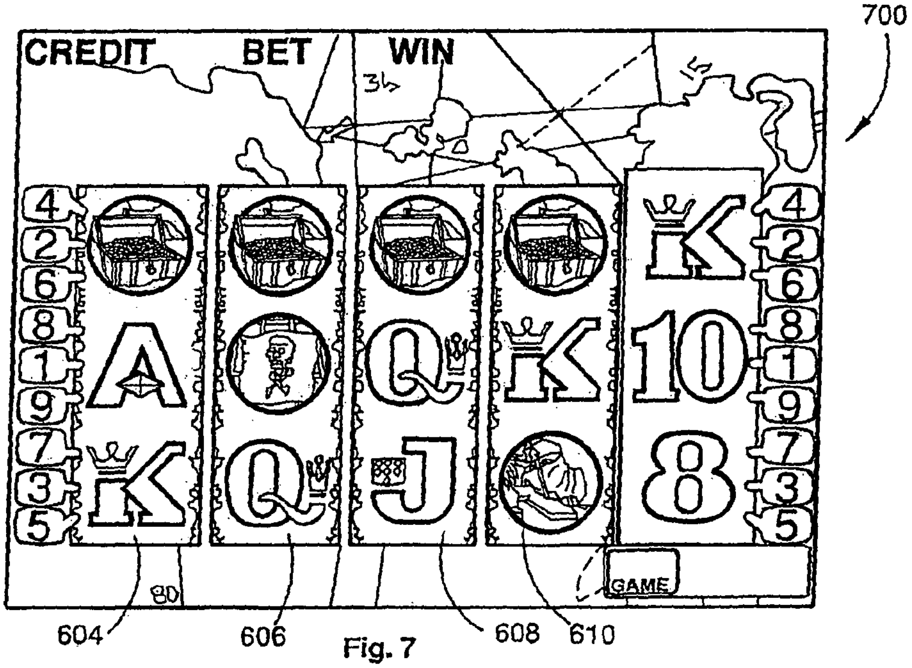
FIG. 7 shows a screen shot of the game of FIG. 6 in which the Golden Reel is uncovered and spun.

This is illustrated in FIG. 7, which shows a screen display 700 in which four treasure chests are displayed on the top row of each of reels 604, 606, 608, 610. The four treasure chests satisfy an eligibility criterion, and accordingly the previously hidden Golden Reel 602 is uncovered. In one arrangement the symbols displayed on the Golden Reel 602 are coloured gold and may be standardised for all Golden Reel games.

In process 510 the uncovered Golden Reel 602 is spun and halted to present three symbols, in this example a king, 10 and 8. In an alternative arrangement the Golden Reel is not spun further. A set of symbols for presentation on the Golden Reel may already have been established, for example when the reels 604-610 are spun. In this arrangement, removing the Golden Reel cover reveals the symbols presented on the reel 602.

In process 512 the controlling software determines an award dependant on the symbols displayed on the reels 602-610. For example, an award may be made if the symbols displayed on the subset of reels 604, 606, 608 and 610 satisfy a specified winning criterion. This award may be modified based on the symbols displayed on the Golden Reel 602. In one arrangement, for example, if a symbol on the Golden Reel 602 forms a sequence of five symbols along a pay line including the other reels 604-610, then the award may be multiplied by five. However, other arrangements may be used. The award based on the four reels 604-610 may be a pending award that is only actually awarded if the symbols displayed on the Golden Reel 602 satisfy a specified condition.

In the Golden Reel feature, a player effectively plays with a subset of reels for potentially a large number of games. If an outcome displayed on the subset of spinning reels indicates a prize or a potential prize, the player is able to uncover at least one hidden reel and spin the hidden reel with a view to improving the prize or acquiring the prize.

In one arrangement the Golden Reel 602 is automatically uncovered if eligibility criteria are met by the symbols displayed on the subset of reels. Alternatively, the player may be prompted to make an input in order for the Golden Reel 602 to be uncovered. The user may make the input using, for example, the bank of buttons 107A or touch screen 107B.

In the examples of FIGS. 6 and 7, the five reels 602-610 are substantially the same shape and are distributed evenly across the displays 106. Other graphical arrangements may also be used. For example, the Golden Reel may be slightly displaced from the other four reels 604-610 to emphasis the separate functioning of the Golden Reel 602.

The foregoing description relates to an arrangement in which the reels are displayed on display 106. The Golden Reel game may also be presented using a plurality of mechanical reels, at least one of which is initially covered.

In the example discussed above, the graphic objects displayed on the displays 106 are spinning reels. However, other types of graphic objects may be used. For example, the game may display representations of a plurality of playing cards. One or more of the displayed playing cards is covered by a golden symbol. A subset of the cards, which are not hidden, may be activated by turning the cards over to reveal a symbol. If an eligibility criterion is met by the displayed symbols, one or more of the cards covered by the golden symbol is uncovered and activated to reveal one or more further symbols.

In another example, the graphic objects displayed on display 106 may be dice. In this example, one or more of the displayed dice may be hidden behind a golden dice symbol. The dice which are not hidden are activated to present respective symbols on the display 106. For example, an animation of one or more rolling dice may be displayed. The rolled dice halt to reveal a symbol. As in all of the examples, the symbols displayed may be selected, for example, using outputs of the random number generator 113.

In other examples, the displayed graphic objects may be representations of balls. For example, in games like keno and bingo, a game displayed on displays 106 could show one or more golden extra balls. A subset of the balls is activated to play the keno or bingo games. If the subset of balls displays symbols that satisfy an eligibility criterion, or if another eligibility criterion is satisfied, then one or more of the hidden golden balls may be activated in the game. The symbol or symbols revealed by the extra balls may modify a prize awarded based on play of the unhidden balls. In general, activating a ball in a keno or bingo game involves revealing a number on a ball. In other arrangements, for example pin and ball games such as Arishinko™, activating a ball in the feature may involve an animation in which the ball moves through a trajectory on the display 106. At a terminus of the trajectory, the ball displays one or more symbols. For pin and ball games like arishinko a hidden extra ball could be used to reveal a "free game".

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method of gaming on a gaming machine using a display, the method comprising:

selecting a plurality of symbols for display on the display, wherein the selected plurality of symbols are to be arranged on the display in at least one first group and a plurality of second groups;

displaying on the display the selected symbols in said at least one first group and said plurality of second groups;

obscuring said at least one first group of symbols displayed on the display;

revealing the obscured said at least one first group of symbols displayed on the display in response to a combination of symbols displayed in said plurality of second groups matching a predefined eligibility criterion, wherein the predefined eligibility criterion is an incomplete winning combination of symbols indicative of a possible award; and awarding the possible award in response to at least one symbol displayed in said at least one first group on the display completing with the incomplete winning combination of symbols.

2. The method of claim 1, and wherein the symbols displayed in the plurality of second groups remain unchanged as symbols are selected for the revealed at least one first group.

3. The method of claim 2, and further comprising generating an indication of a possible award if the eligibility criterion is satisfied.

4. The method of claim 1, and wherein the at least one first group and the plurality of second groups symbols are representations of reels.

5. The method of claim 4, and wherein displaying on the display the selected symbols in said at least one first group and said plurality of second groups comprises displaying a depiction of one or more of the reels spinning and halting the spun said one or more of the reels to present at least one symbol.

6. A method of gaming on a gaming machine using a display, the method comprising:

selecting for display a plurality of symbols available on a plurality of reels, each reel having a set of symbols;

spinning a subset of the reels while obscuring at least one of the remaining reels;

revealing for displaying at least one symbol from the obscured said at least one remaining reel in response to a combination of symbols displayed on the subset of reels matching a predefined eligibility criterion, wherein the predefined eligibility criterion is an incomplete winning combination of symbols indicative of a possible award; and awarding the possible award in response to at least one symbol revealed in said at least one of the remaining reels completing the displayed incomplete winning combination of symbols of the subset of reels.

7. A gaming machine comprising:

a display, a game controller, and a user interface in communication with the game controller, the game controller being operable to:

select a plurality of symbols for display on the display, wherein the selected plurality of symbols are to be arranged on the display in at least one first group and a plurality of second groups;

display on the display the selected symbols in said at least one first group and said plurality of second groups;

obscure said at least one first group of symbols displayed on the display;

reveal the obscured said at least one first group of symbols displayed on the display in response to a combination of symbols displayed in said plurality of second groups matching a predefined eligibility criterion, wherein the predefined eligibility criterion is an incomplete winning combination of symbols indicative of a possible award; and award the possible award in response to at least one symbol displayed in said at least one first group on the display completing the incomplete winning combination of symbols.

8. A gaming machine comprising:

a plurality of reels, each of said reels having a set of symbols; and a game controller arranged to:

select for display a plurality of symbols available on said plurality of reels;

spin a subset of the reels while obscuring at least one of the remaining reels;

reveal for displaying at least one symbol from the obscured said at least one of the remaining reels in response to a combination of symbols displayed on the subset of reels matching a predefined eligibility criterion, wherein the predefined eligibility criterion is an incomplete winning combination of symbols indicative of a possible award; and award the possible award in response to at least one symbol revealed in said at least one of the remaining reel completing the displayed incomplete winning combination of symbols of the subset of reels.

* * * * *

UNITED STATES PATENT AND TRADEMARK OFFICE

CERTIFICATE OF CORRECTION

PATENT NO. : 8,469,793 B2
APPLICATION NO. : 12/196842
DATED : June 25, 2013
INVENTOR(S) : Visser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this
Twenty-seventh Day of January, 2015

Michelle K. Lee
*Deputy Director of the United States Patent and Trademark Office*